United States Patent [19]
Schlager et al.

[11] Patent Number: 5,920,166
[45] Date of Patent: *Jul. 6, 1999

[54] CONTROL OF SLEW RATE DURING TURN-ON OF MOTOR DRIVER TRANSISTORS

[75] Inventors: Karl M. Schlager, Campbell; Massimiliano Brambilla, San Jose, both of Calif.

[73] Assignee: STMicroelectronics, Inc., Carrollton, Tex.

[*] Notice: This patent is subject to a terminal disclaimer.

[21] Appl. No.: 08/843,918

[22] Filed: Apr. 17, 1997

Related U.S. Application Data

[63] Continuation of application No. 08/315,766, Sep. 30, 1994, Pat. No. 5,661,383.

[51] Int. Cl.$^6$ .................................................. A01R 39/46
[52] U.S. Cl. .......................... 318/439; 318/254; 318/138
[58] Field of Search ................................ 318/439, 254, 318/138

[56] References Cited

U.S. PATENT DOCUMENTS

| | | | |
|---|---|---|---|
| 4,274,014 | 6/1981 | Schade, Jr. ................................ 307/585 |
| 4,349,771 | 9/1982 | Buxton ................................ 318/439 X |
| 4,429,270 | 1/1984 | Davies et al. .......................... 323/317 |
| 4,527,102 | 7/1985 | Gotou ...................................... 318/254 |
| 5,191,269 | 3/1993 | Carbolante ............................... 318/254 |
| 5,477,489 | 12/1995 | Wiedmann .......................... 365/189.04 |

*Primary Examiner*—Karen Masih
*Attorney, Agent, or Firm*—David V. Carlson; Theodore E. Galanthay; Lisa K. Jorgenson

[57] ABSTRACT

A circuit for controlling the slew rate at a motor coil during turn-on in a commutation sequence is disclosed. The disclosed circuit includes a switched current mirror that receives the commutation signal, and that provides a mirrored current to the input of an integrating buffer amplifier when its associated coil is to be driven. The integrating buffer amplifier includes an amplifier with a feedback capacitor, and a current source connected at its input, for reducing the voltage slew rate during turn-off of the transistor. The mirrored current applied to the input on the integrating buffer amplifier is greater than that of the current source, but limited so as to reduce the voltage slew at the coil.

28 Claims, 3 Drawing Sheets

CONTROL OF SLEW RATE DURING TURN-ON OF MOTOR DRIVER TRANSISTORS

CROSS-REFERENCE TO RELATED APPLICATION

This application is a continuation of U.S. patent application Ser. No. 08/315,766, filed Sep. 30, 1994 now U.S. Pat. No. 5,661,383.

This invention is in the field of motor control, and is more particularly directed to control of drive signals applied to motors.

BACKGROUND OF THE INVENTION

Modern polyphase DC motors have become commonplace in precision equipment such as hard disk drives of modern personal computer and workstation equipment, where the requirements of positional accuracy and operational speed are quite stringent. As a result, control circuitry for such motors has become quite sophisticated in ensuring rapid and uniform drive of the disk drive motors. "Glitches" and other nonlinearities such as torque ripple are highly undesirable in the drive of these motors, as they reduce motor performance, increase undesired acoustical noise, and increase the rate of motor wear.

Conventional polyphase DC motors are powered by the application of current to one or more selected stator coils of the motor according to a predetermined sequence to produce a varying magnetic field that rotates a permanent magnet rotor. The sequence in which the current is applied to the stator coils is generally referred to as the commutation sequence, as the drive current is commutated among the various stator coils in the sequence. This commutation produces electrical transients, however, as a result of the inductive nature of the stator coils; these transient effects are manifest in non-uniformity (i.e., "ripple") in the torque applied to the motor, and also in electromagnetic interference ("EMI") generated by the commutation.

Various techniques have previously been used to reduce the electrical transients from commutation, and thus reduce torque ripple and EMI. One such technique is described in U.S. Pat. No. 5,191,269, issued Mar. 2, 1993, assigned to SGS-Thomson Microelectronics, Inc. and incorporated herein by this reference. In this technique, a current integrator is used to control the gates of field-effect drive transistors in such a manner as to reduce the slew rate, or time rate of change of voltage, at the stator coil when the drive transistor for that coil is turned off.

Referring now to FIG. 1, the motor drive circuitry in this prior arrangement will now be described in detail. Motor 10 includes stator coils 4A, 4B, 4C, through which current is driven in operation of the motor to turn the rotor (not shown). Each of stator coils 4A, 4B, 4C is connected to the drain of a corresponding field-effect drive transistor 8A, 8B, 8C, respectively, at nodes A, B, C. In this example, center tap CT of motor 10 is biased to $V_{CC}$ through transistor 9 (while line UNI is maintained high), and as such drive transistors 8A, 8B, 8C are "low-side" drivers, as they control the current conducted to ground through its corresponding stator coil 4A, 4B, 4C. The sources of each of drive transistors 8A, 8B, 8C are connected in common to one end of a sense resistor 6, which has its other end connected to ground.

The gates of drive transistors 8A, 8B, 8C in this prior arrangement are driven by a buffer amplifier 12A, 12B, 12C under control of an error amplifier 2 that is implemented, in this example, as an operational transconductance amplifier (OTA). The output of error amplifier 2 is connected to switches 5A, 5B, 5C, each of which are connected to the input of its corresponding respective buffer amplifier 12A, 12B, 12C. Switches 5A, 5B, 5C are controlled by a conventional commutation sequencer circuit (not shown) which produces an active signal on lines SWA, SWB, SWC, respectively, according to the desired commutation sequence. Error amplifier 2 receives a command signal on line IN, and a feedback signal on line FB from the top end of sense resistor 6, and produces an output current proportional to the differential voltage between the command signal on line IN and the sensed voltage on line FB (which corresponds to the sum of the drive currents through coils 4A, 4B, 4C). In this way, error amplifier 2 controls the drive of motor 10 according to an external control signal, with the balanced condition being that the feedback voltage on line FB, corresponding to drive current sensed by sense resistor 6, equals that commanded by the signal on line IN.

In operation, if stator coil 4A is to conduct current in a specific commutation phase, for example, line SWA will be driven high by the commutation sequencer, and lines SWB, SWC will be driven low. The output of error amplifier 2, indicating the amount of drive current to be driven to the selected stator coil 4, will then be applied to the input of buffer amplifier 12A, which in turn turns on low side drive transistor 8A to the extent indicated by error amplifier 2. Current will then be conducted from $V_{CC}$ through transistor 9, center tap CT and coil 4A to the extent allowed by drive transistor 8A. If the next commutation phase requires stator coil 4B to conduct rather than stator coil 4A, line SWB sill be driven high and line SWA (and line SWC) will be driven low, turning on transistor 8B and turning off transistor 8A, thus conducting current through stator coil 4B rather than stator coil 4A. The sequence continues in the same manner, with stator coil 4C next conducting, to rotate the motor at the desired speed indicated by the command signal on line IN.

While this example illustrates operation of motor 10 in a unipolar mode, motor 10 may also or instead be driven in the well-known bipolar mode, in which center tap CT will not be driven and in which high-side driver transistors will drive each of nodes A, B, C in sequence in combination with low-side driver transistors 8A, 8B, 8C. In this mode, two stator coils 4 will be driven in each commutation phase, to the extent controlled by one of the drive transistors (generally the low-side drive transistors 8), with one stator coil 4 sourcing current toward center tap CT and with the other stator coil 4 sinking current therefrom.

In the arrangement of FIG. 1, as described in the above-incorporated U.S. Pat. No. 5,191,269, a current integrating function is provided to reduce voltage transients at nodes A, B, C that result when the corresponding respective drive transistor 8A, 8B, 8C is turned off in commutation. These transients result from the inability to instantaneously change the current through an inductor, such as through stator coils 4A, 4B, 4C. The current integrating is implemented by current sources 14A, 14B, 14C, each connected to the input of a corresponding respective buffer amplifier 12A, 12B, 12C, and by capacitors 7A, 7B, 7C connected between nodes A, B, and C, respectively, and the input to the corresponding buffer amplifier 12A, 12B, 12C, respectively. The effect of current sources 14 and capacitors 7 is to limit the voltage slew rate at nodes A, B, C when the corresponding drive transistor 8 is turned off.

In brief, referring by way of example to node A, the voltage $V_A$ at node A will obey the following relationship when transistor 8A is turned off:

$$\frac{\Delta V_A}{\Delta t} = \frac{i_{14A}}{C_7}$$

where $i_{14A}$ is the current sourced by current source 14A, and where $C_7$ is the capacitance of capacitor 7A. Accordingly, the provision of current sources 14 and capacitors 7 serve well to reduce the voltage slew rate at stator coils 4 during commutation.

Relative to the arrangement of FIG. 1, it has been observed, however, that voltage transients still remain to some extent at those nodes for which the corresponding drive transistor is turning on. FIG. 2 illustrates the operation of the circuit of FIG. 1 at the commutation between stator coil 4A being driven to stator coil 4B being driven. At time $t_0$, the voltage $V_A$ at node A is low, the voltage $V_B$ at node B is high, the current $I_A$ through stator coil $4_A$ is at high level and the current $I_B$ through stator coil $4_B$ is off. The operation of sense resistor 6 with error amplifier 2 means that the drive currents are controlled so that the sum of the coil currents $i_A$, $i_B$, $i_C$ is constant ($i_C$ being zero in this example of commutation from coil 4A to coil 4B).

At time $t_1$, line SWA goes low and line SWB goes high, to turn off transistor 8A and turn on transistor 8B. Because of the reduced slew rate provided by current source 14A and capacitor 7A noted above, the voltage $V_A$ slowly ramps up toward its eventual high voltage, at a rate corresponding to the ratio $i_{14A}/C_7$, as noted above; qualitatively, the instantaneous current through stator coil 4A is absorbed by capacitor 7A in such a way as to prevent a positive-going voltage spike at node A at $t_1$.

However, since the current $I_B$ through stator coil 4B a time $t_0$ is zero, and since this current cannot instantaneously change at time $t_1$, transistor 8B will not be conducting current at such time as it is turned on at time $t_1$. In addition, the current provided at the output of error amplifier 2 is also quite large, and is substantially absorbed by capacitor 7B when switch 5B is turned on at time $t_1$. These events result in the drain voltage of transistor 8B immediately collapsing low due to the lack of drain-to-source current and to the rapid charging of capacitor 7B. This rapid transient results in significant ringing of the voltage $V_B$ at node B, as shown in FIG. 2, and thus in a significant amount of undesired electromagnetic interference (EMI).

It is therefore an object of the present invention to provide a circuit and method for reducing the turn-on transients in the commutation of a polyphase DC motor.

It is a further object of the present invention to accomplish these results by limiting the voltage slew rate at the coils during turn-on.

It is a further object of the present invention to provide such circuitry which presents a relatively low input impedance to the error amplifier after the period of limited voltage slew rate in a commutation phase.

Other objects and advantages of the present invention will be apparent to those of ordinary skill in the art having reference to the following specification together with its drawings.

SUMMARY OF THE INVENTION

The present invention may be implemented by way of a current mirror at the input to the current integrating driver of drive transistors in a motor control circuit for a polyphase DC motor. The current mirror includes a switching current source in its primary leg, so as to limit the amount of current that is applied by the secondary current mirror leg to the input of the integrating capacitor, which limits the voltage slew rate at the coil node when the drive transistor is turned on. The current mirror also serves to present a low input impedance to the error amplifier after the initial transient period has passed.

DETAILED DESCRIPTION OF THE PREFERRED EMBODIMENT

Figure 3:
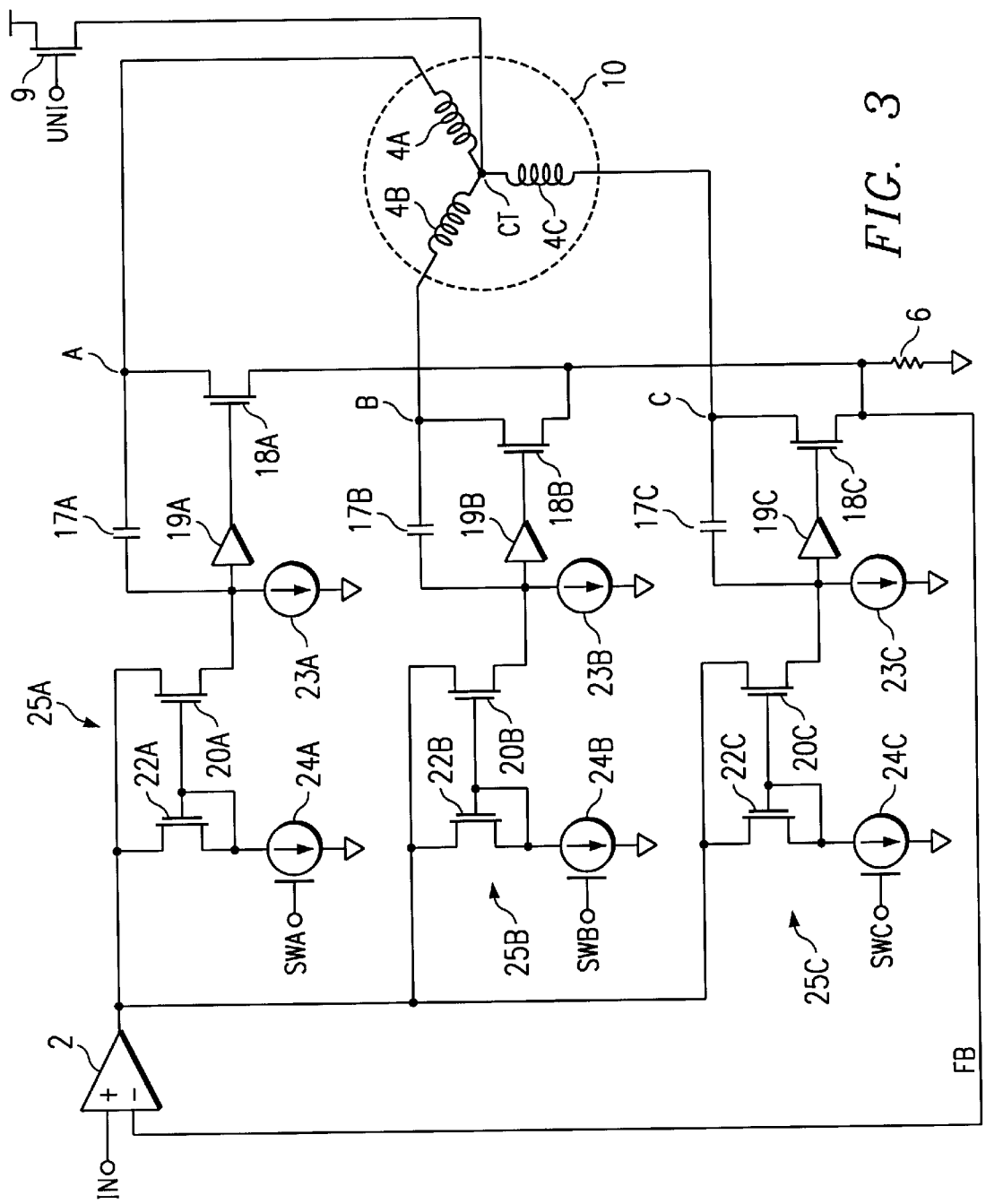
FIG. 3 is an electrical diagram, in schematic form, of a driver circuit for a polyphase DC motor according to the preferred embodiment of the invention.

Referring now to FIG. 3, a driver circuit for a polyphase DC motor according to the present invention will now be described in detail. This embodiment of the invention is directed to a three-phase DC motor configured in the well-known "Y" configuration, and which is driven by commutation of low-side drive transistors according to the well-known unipolar mode arrangement. It will be appreciated by those or ordinary skill in the art that other motor arrangements, including motors having more than three phases can also benefit from the present invention. In addition, as is well known in the art, polyphase DC motors are also operated in a bipolar mode in which two coils are driven, and thus in which both high-side and low-side drivers are provided for each coil; indeed, many motors can be driven in either mode, such as in a bipolar mode on startup and a unipolar mode after reaching a certain speed. It is contemplated that the present invention is also applicable to polyphase DC motors driven in bipolar mode, and that the present invention may be applied to control the high-side drive transistors instead of the low-side drive transistors as will be described hereinbelow. It is further contemplated that these and other alternative embodiments of the present invention will be apparent to those of ordinary skill in the art having reference to this specification and its drawings.

Figure 1:
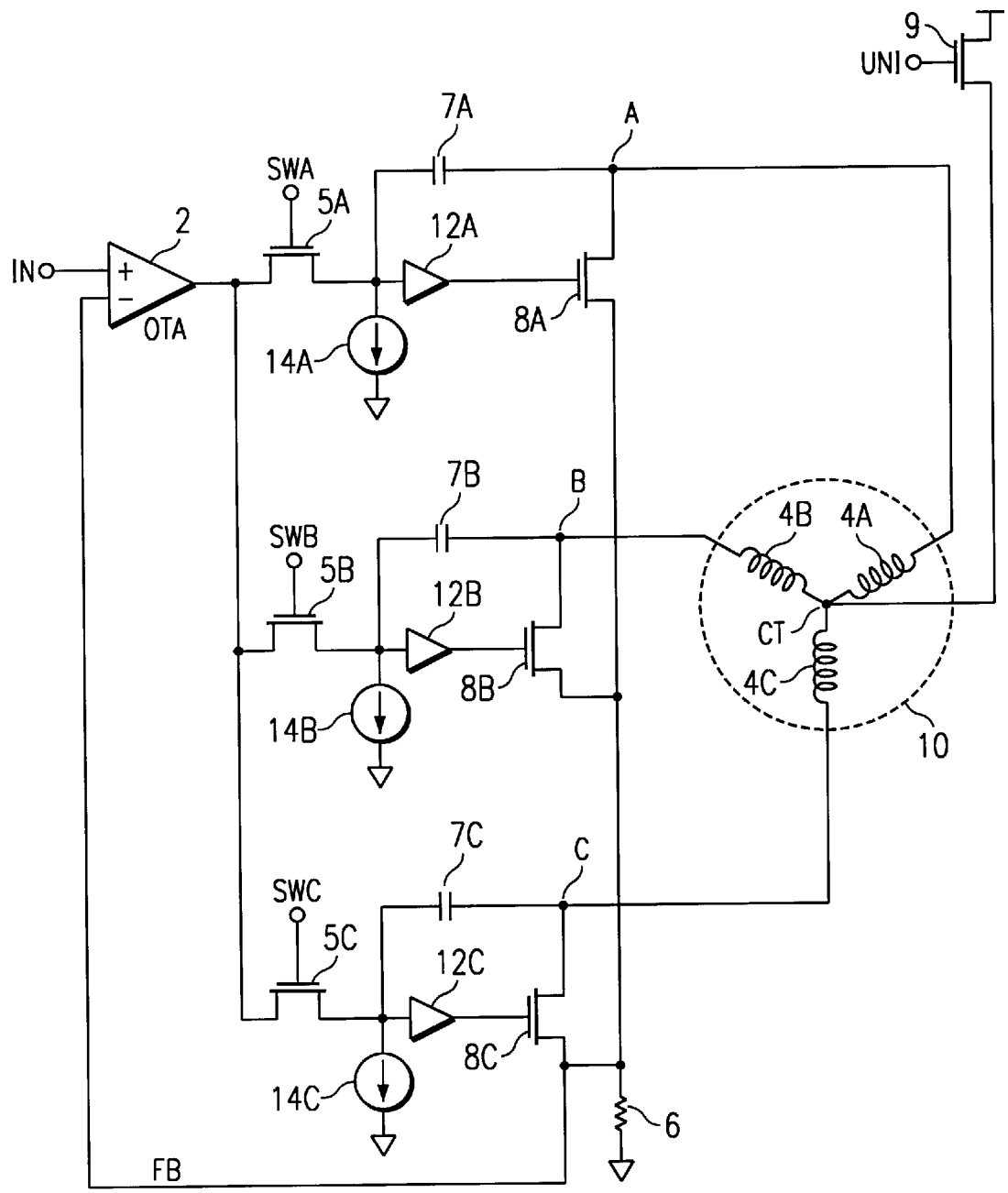
FIG. 1 is an electrical diagram, in schematic form, of a driver circuit for a polyphase DC motor according to the prior art.

In FIG. 3, motor 10 includes three stator coils 4A, 4B, 4C arranged in a "Y" configuration as in the case of FIG. 1. Transistor 9 connects center tap CT to a high voltage $V_{CC}$ while in unipolar mode, which is indicated by line UNI at a high level to turn on transistor 9. Each stator coil 4A, 4B, 4C is connected to the drain of n-channel field-effect low-side drive transistor 18A, 18B, 18C, respectively, at corresponding respective nodes A, B, C; transistors 18 may alternatively be implemented as bipolar transistors, p-channel transistors, or the like. Sense resistor 6 is connected between ground and the commonly-connected sources of drive transistors 18A, 18B, 18C, to provide a feedback voltage on line FB corresponding to the sum of the drive currents through coils 4A, 4B, 4C.

Alternatively, sensing of the drive current through coils 4A, 4B, 4C for purposes of providing feedback control may be done by other techniques. For example, copending application Ser. No. 08/315,924, filed Sep. 30, 1994, entitled "Improved Current Sensing and Control in Brushless DC Motors" (Attorney's Docket No. 94-S-008), assigned to SGS-Thomson Microelectronics, Inc. and incorporated herein by this reference, describes a current mirror sensing technique for sensing the drive current both in bipolar and unipolar drive modes.

Similarly as described hereinabove relative to FIG. 1, the gates of drive transistors 18A, 18B, 18C in this prior arrangement are driven by a buffer amplifier 19A, 19B, and 19C. Detailed construction of an example of buffer amplifier 19 is described in the above-incorporated U.S. Pat. No. 5,191,269. As described therein and also hereinabove, a current integrating function is implemented by current sources 19A, 19B, and 19C, each connected to the input of its respective buffer amplifier 22A, 22B, 22C, and by capacitors 17A, 17B, 17C connected between drive nodes A, B, C, respectively, and the input to the corresponding respective buffer amplifier 19A, 19B, and 19C. As described above, current sources 23 and capacitors 17 limit the voltage slew rate at nodes A, B, C when the corresponding drive transistor 18 is turned off.

The motor driver of FIG. 3 also includes error amplifier 2, which receives a command signal from line IN at its non-inverting input, and the feedback voltage on line FB at its inverting input. According to this embodiment of the invention, the output of error amplifier 2 is applied to each of current mirrors 25A, 25B, 25C, associated with stator coils 4A, 4B, 4C, respectively.

Each current mirror 25 is constructed of a pair of n-channel field effect transistors 20, 22 having their drains connected to the output of error amplifier 2 and having their gates connected in common to the source of transistor 22. Transistors 20, 22 preferably match one another in size (i.e., ratio of channel width to channel length) so that their drive characteristics are substantially equal and so that they conduct equal current by virtue of the current mirror arrangement; alternatively, the relative sizes of transistors 20, 22 may be selected to conduct a ratioed current relative to one another. The source of transistor 22 in each of current mirrors 25 is connected to a switched current source 24 which, when operating, sinks a specified current to ground. Current sources 24A, 24B, 24C in current mirrors 25A, 25B, 25C, respectively, are controlled by commutation signal applied to lines SWA, SWB, SWC, respectively, which are generated by a commutation sequencer (not shown) in the conventional manner. Each of switched current sources 24 are preferably implemented by way of a field-effect transistor biased to the appropriate point as to provide a fixed current upon its gate being energized to a high logic level; it is contemplated that such construction will be readily apparent to one of ordinary skill in the art. The current sourced by each current source 24 in this example is preferably larger than that sourced by each current source 23. In this example, each of current sources 24A, 24B, 24C conduct no current when its respective input line SWA, SWB, SWC is low, and conducts a fixed current when its respective input line SWA, SWB, SWC is at a high logic level. The source of transistors 20A, 20B, 20C are connected to the input of buffer amplifiers 22A, 22B, 22C, respectively.

In operation, error amplifier 2 receives a command signal on line IN and a feedback signal on line FB from the top end of sense resistor 6, and produces an output proportional to the differential voltage between the command signal on line IN and the sensed voltage on lien FB corresponding to the sum of the drive currents through coils 4A, 4B, 4C. This output from error amplifier 2 is applied to the drains of each of transistors 20, 22 in each of current mirrors 25A, 25B, 25C. The current sources 24A, 24B, 24C for those of current mirrors 25A, 25B, 25C having low corresponding input lines SWA, SWB, SWC are turned off, as noted above. When a current source 24 is turned off, its transistor 20 will apply no current to the input of the corresponding buffer amplifier 22, and the corresponding drive transistors 18 will thus be turned off.

However, the one of current mirrors 25A, 25B, 25C receiving a high level on its corresponding input line SWA, SWB, SWC will have its current source 24A, 24B, 24C turned on. By way of example, if line SWA is high and lines SWB, SWC are low, transistors 20B, 20C will not be applying current to buffer amplifiers 22B, 22C and thus transistors 18B, 18C will be turned off. However, with line SWA high, current source 24A will be conducting a fixed current through transistor 22A, and this fixed current will be mirrored by transistor 20A and applied to the input of buffer amplifier 19A. Accordingly, buffer amplifier 19A will be turned on by the excess current from transistor 20A, and will turn on transistor 18A so that current is conducted by stator coil 4A in motor 10. The extent to which transistor 18A is turned on will be determined by the extent of the drive applied by error amplifier 2 based on a comparison of the feedback voltage on line FB with the command input on line IN, as before.

Figure 4:
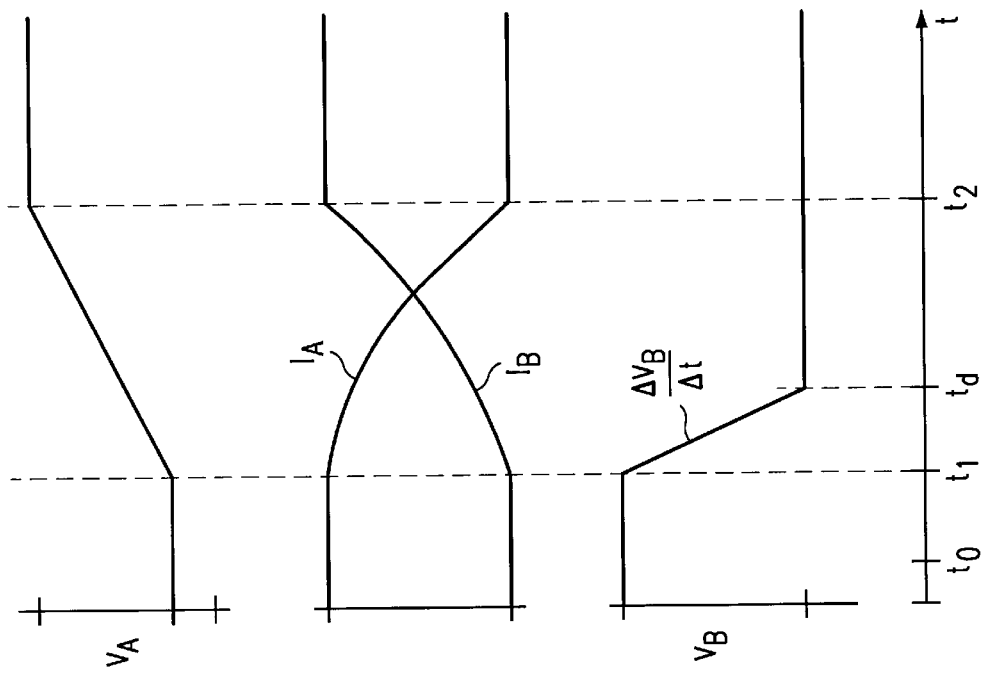
FIG. 4 is a timing diagram illustrating the operation of the circuit of FIG. 3.

Referring now to FIG. 4, for example, the above-described condition where stator coil 4A is conducting current and stator coils 4B, 4C are not, is illustrated at time $t_0$. As the example of commutation illustrated in FIG. 4 is the switching of current from coil 4A to coil 4B, the voltage and current relative to coil 4C will not be illustrated; of course, operation of the circuit of FIG. 3 for the other commutations in the sequence will be equivalent. At this point in time, transistor 18A is on and transistors 18B, 18C are off; as such, the current $I_A$ through coil 4A is at a high level and the current $I_B$ through coil 4B is zero, and the voltage $V_A$ at node A is low and the voltage $V_B$ at node B is high.

At the $t_1$ in the example of FIG. 4, a commutation from the phase in which coil 4A conducts to the phase in which coil 4B conducts is initiated by line SWA returning low and line SWB going to a high logic level (line SWC remaining low). With line SWA going low, the current through transistors 20A, 22A goes to zero, removing current from the input of buffer amplifier 19A, turning off low side drive transistor 18A. As described hereinabove, the integrating function implemented by capacitor 17A reduces the voltage slew rate at node A to the following:

$$\frac{\Delta V_A}{\Delta t} = \frac{i_{23A}}{C_{17}}$$

where $i_{23A}$ is the current sourced by current source 23A, and where $C_{17}$ is the capacitance of capacitor 17A.

Also at time $t_1$, with line SWB going high to turn on current mirror 24B, current begin to be applied from the output of error amplifier 2 to the input of buffer amplifier 19B via transistor 20B. Because of current mirror 25B, however, the current through transistor 20B is limited to the current sourced by current source 24B, in this example where the size of transistor 22B matches that of transistor 20B (if transistors 20B, 22B are of different sizes, of course, the ratio of the currents therethrough will behave accordingly). This current (e.g., on the order of 15 μA) is much reduced from that which would otherwise have been applied to the input of buffer amplifier 12B by a typical error amplifier 2. Accordingly, the current applied to the input of buffer amplifier 12B is limited immediately upon the switching at time $t_1$ to the current $i_{24B}$ of current source 24B less the current $i_{23}B$ of current source 23B. By rudimentary operational amplifier analysis methods, the time rate of change of voltage $V_B$ at node B therefore follows the relationship:

$$\frac{\Delta V_B}{\Delta t} = -\frac{i_{24B} - i_{23B}}{C_{17B}}$$

where $i_{23B}$ is the current sourced by current source 23B, where $i_{24B}$ is the current sourced by current source 24B, and where $C_{17B}$ is the capacitance value of capacitor 17. The slope of this voltage slew is qualitatively illustrated in FIG. 4 relative to the voltage $V_B$, with the voltage $V_B$ reaching its low level at time $t_d$. At time $t_2$, the commutation is complete, with current $I_A$ through coil 4A reaching zero and the current $I_B$ through coil 4B reaching the driven level determined by error amplifier 2.

After time $t_d$, capacitor 17B will be fully charged by the current from mirror transistor 20B. Buffer amplifier 19B will then operate in a voltage control mode, so that its output will follow the voltage at the output of error amplifier 2.

Figure 2:
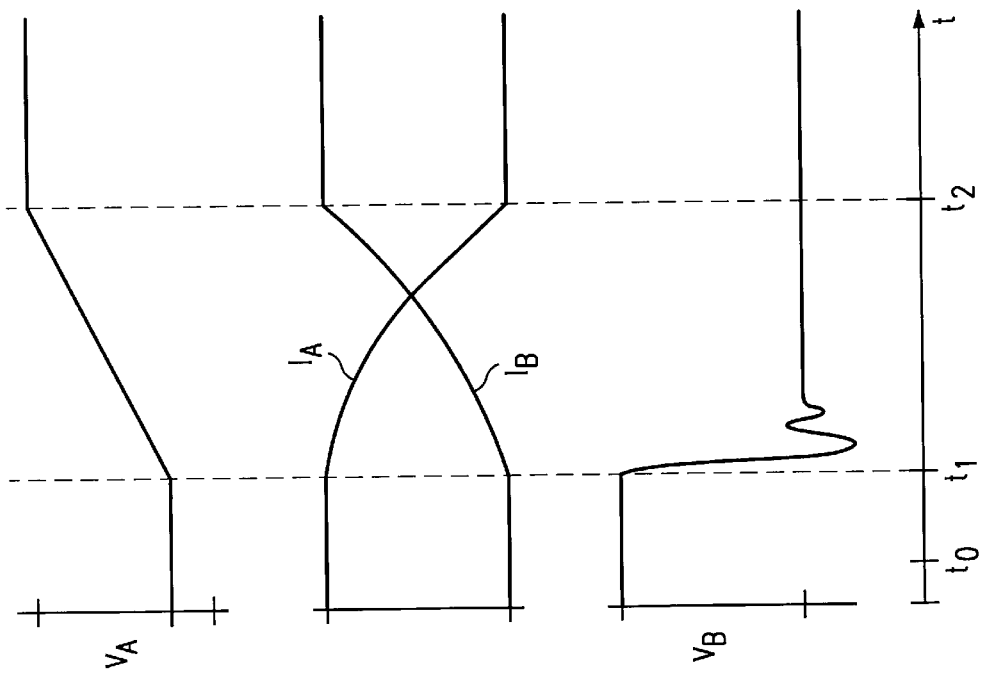
FIG. 2 is a timing diagram illustrating the operation of the circuit of FIG. 1.

By way of example, exemplary values for the various parameters in the circuit of FIG. 3 may have the current $I_{23}$ (for each of current sources 23A, 23B, 23C) on the order of 5 $\mu$A, the current $I_{24}$ (for each of current sources 24A, 24B, 24C) may be on the order of 15 $\mu$A, and the capacitance value $C_{17}$ (for each of capacitors 17A, 17B, 17C) may be on the order of 20 pF. Accordingly, for these parameter values, the turn-off slew rate will be approximately 0.25 volts/$\mu$sec and the turn-on slew rate would be approximately 0.5 volts/$\mu$sec. These slew rates are believed to provide adequate noise performance while still providing high performance motor operation. The electromagnetic interference (EMI) generated by the turning on of driver transistors according to the present invention is therefore much reduced, as is apparent from a comparison of FIG. 4 to FIG. 2.

In addition to the reduced EMI, the present invention also provides the important benefit that transistors 20 present a relatively low input impedance to the output of error amplifier 2, once the slew rate limiting function is complete (i.e., after time $t_d$ in FIG. 4). This low input impedance results from operation of the current mirrors 25, once capacitor 17 for the conducting coil is fully charged up. In this case, buffer amplifiers 19 will quickly respond to variations in the output current produced by error amplifier 2 in response to a differential between the feedback voltage and the command input.

While the invention has been described herein relative to its preferred embodiment, it is of course contemplated that modifications of, and alternatives to, this embodiment, such modifications and alternatives obtaining the advantages and benefits of this invention, will be apparent to those of ordinary skill in the art having reference to this specification and its drawings. It is contemplated that such modifications and alternatives are within the scope of this invention as subsequently claimed herein.

We claim:

1. A circuit for controlling a slew rate of a driving transistor in a DC motor having a plurality of stator coils, the driving transistor having a first terminal coupled to a first end of a selected stator coil, a second terminal coupled to a first reference voltage, and a control terminal, a second end of the stator coil being coupled to a second reference voltage, the circuit comprising:

a capacitor coupled to the control terminal of the driving transistor;

an error circuit coupled to the DC motor and structured to generate an error signal; and a current generating circuit coupled to the capacitor and to the error circuit to receive the error signal, the current generating circuit being structured to provide to the capacitor a controlled current based on the error signal, the current generating circuit limiting the controlled current to a maximum level to control a rate of change of a voltage on the capacitor which controls the slew rate of the driving transistor coupled to the capacitor.

2. The circuit of claim 1, further comprising a current source coupled to the capacitor to draw a current from the capacitor.

3. The circuit of claim 2 wherein the current source is a constant current source.

4. The circuit of claim 1 wherein the capacitor comprises:

a first plate coupled to the control terminal of the driving transistor and to the current generating circuit; and a second plate coupled to the first terminal of the driving transistor.

5. The circuit of claim 1, further comprising:

a buffer amplifier circuit coupled between the capacitor and the control terminal of the driving transistor to transfer a voltage from the capacitor to the control terminal of the driving transistor.

6. The circuit of claim 1 wherein the driving transistor is a low side driving transistor and the first reference voltage is a ground reference voltage.

7. The circuit of claim 1 wherein the error circuit comprises:

a sense resistor coupled to the DC motor to generate a feedback signal proportional to a total amount of current in the stator coils; and an error amplifier circuit having a first input coupled to receive the feedback signal, a second input coupled to receive a command signal, and an output, the error amplifier circuit being structured to generate the error signal at its output based on a difference between the feedback signal and the command signal.

8. The circuit of claim 1 wherein the current generating circuit is coupled to receive a commutation signal, the current generating circuit being structured to provide the controlled current to the capacitor when the commutation signal is enabling.

9. The circuit of claim 8 wherein the current generating circuit comprises:

a current mirror circuit having an input connected to the error circuit and an output connected to the capacitor, and a current source connected to the current mirror circuit to draw a current from the current mirror circuit, the controlled current being proportional to the current drawn by the current source.

10. The circuit of claim 9 wherein the current source is a controlled current source which limits the current drawn from the current mirror circuit to the maximum level such that the controlled current is limited to the maximum level.

11. The circuit of claim 9 wherein the current source is a switched current source coupled to receive the commutation signal, the current source being structured to draw the current from the current mirror circuit when the commutation signal is enabling.

12. The circuit of claim 11 wherein the current mirror circuit comprises:

a first transistor having a gate, a drain, and a source, the drain being the input of the current mirror circuit;

a second transistor having a drain connected to the drain of the first transistor, a gate connected to the source and gate of the first transistor, and a source connected to the capacitor, the source being the output of the current mirror circuit; and wherein the drains of the first and second transistors are coupled to the error circuit to receive the error signal and the current source is structured to draw the current from the source of the first transistor in response to the error signal when the commutation signal is enabling so that the controlled current produced at the source of the second transistor is proportional to the current drawn by the current source.

13. The circuit of claim 12 wherein the first and second transistors are matched such that the controlled current is substantially equal to the current drawn by the current source.

14. A DC motor comprising:

a plurality of stator coils connected to a center tap, each of the stator coils having a first end and a second end connected to the center tap;

a plurality of driving transistors, each driving transistor having a first terminal coupled to the first end of a respective one of the stator coils, a second terminal coupled to a reference voltage, and a control terminal;

a plurality of capacitors, each capacitor being coupled to the control terminal of a respective one of the driving transistors;

an error circuit structured to generate an error signal; and a plurality of current generating circuits, each current generating circuit being coupled to a respective one of the capacitors and to the error circuit to receive the error signal, each current generating circuit being structured to provide to its respective capacitor a controlled current based on the error signal, each current generating circuit limiting the controlled current to a maximum level to control a rate of change of a voltage on its respective capacitor which controls a slew rate of the respective driving transistor coupled to the respective capacitor.

15. The DC motor of claim 14, further comprising a plurality of constant current sources, each constant current source being coupled to a respective one of the capacitors to draw a current from the respective capacitor.

16. The DC motor of claim 14, further comprising a plurality of buffer amplifier circuits, each buffer amplifier circuit being coupled between a respective one of the capacitors and a control terminal of a respective one of the driving transistors to transfer a voltage from the respective capacitor to the control terminal of the respective driving transistor.

17. The DC motor of claim 14 wherein the error circuit comprises:

a sense resistor structured to generate a feedback signal proportional to a total amount of current in the stator coils; and an error amplifier circuit having a first input coupled to receive the feedback signal, a second input coupled to receive a command signal, and an output, the error amplifier circuit being structured to generate the error signal at its output based on a difference between the feedback signal and the command signal.

18. The DC motor of claim 14 wherein each current generating circuit comprises:

a current mirror circuit having an input connected to the error circuit and an output connected to the respective capacitor; and a current source connected to the current mirror circuit to draw a current from the current mirror circuit, the controlled current being proportional to the current drawn by the current source.

19. The circuit of claim 18 wherein the current source is a controlled current source which limits the current drawn from the current mirror circuit to the maximum level such that the controlled current is limited to the maximum level.

20. The circuit of claim 19 wherein the current source is a switched current source coupled to receive a commutation signal, the current source being structured to draw the current from the current mirror circuit when the commutation signal is enabling such that the current generating circuit is structured to provide the controlled current to the respective capacitor when the commutation signal is enabling.

21. The circuit of claim 20 wherein the current mirror circuit comprises:

a first transistor having a gate, a drain, and a source, the drain being the input of the current mirror circuit;

a second transistor having a drain connected to the drain of the first transistor, a gate connected to the source and gate of the first transistor, and a source connected to the respective capacitor, the source being the output of the current mirror circuit; and wherein the drains of the first and second transistors are coupled to the error circuit to receive the error signal and the current source is structured to draw the current from the source of the first transistor in response to the error signal when the commutation signal is enabling so that the controlled current produced at the source of the second transistor is proportional to the current drawn by the current source.

22. A method for controlling a slew rate of a driving transistor that drives a selected one of a plurality of stator coils in a DC motor, the driving transistor having a first terminal coupled to a first end of the selected stator coil, a second terminal coupled to a first reference voltage, and a control terminal, the method comprising:

coupling a second end of the selected stator coil to a second reference voltage;

coupling a capacitor to the control terminal of the driving transistor;

generating an error signal proportional to current in the stator coils;

providing to the capacitor a controlled current based on the error signal; and limiting the controlled current to a maximum level to control a rate of change of a voltage on the capacitor which controls the slew rate of the driving transistor coupled to the capacitor.

23. The method of claim 22 wherein the act of coupling a capacitor comprises coupling a capacitor to the control terminal of the driving transistor through a buffer amplifier circuit.

24. The method of claim 22 wherein the act of generating an error signal comprises:

sensing an amount of current in the stator coils of the DC motor;

providing a feedback signal based on the amount of current in the stator coils;

providing a command signal; and generating the error signal based on a difference between the feedback signal and the command signal.

25. The method of claim 22, further comprising, drawing a constant current from the capacitor.

26. The method of claim 22 wherein the act of providing to the capacitor a controlled current comprises:

applying the error signal to a current mirror circuit;
drawing a current from the current mirror circuit;
generating the controlled current from the current mirror circuit based on the error signal, the controlled current being proportional to the current drawn from the current mirror circuit; and
providing the controlled current to the capacitor.

27. The method of claim 22 wherein the act of providing to the capacitor a controlled current comprises:

applying the error signal to first and second transistors in a current mirror circuit;
drawing a current from the first transistor in response to the error signal; and
coupling the second transistor to the first transistor in a current mirror configuration so that the controlled current is drawn through the second transistor in response to the error signal, the controlled current being proportional to the current drawn from the first transistor.

28. The method of claim 22, further comprising providing a commutation signal to enable the driving transistor to be switched on, the controlled current being provided to the capacitor when the commutation signal is enabling.

* * * * *